(12) United States Patent
Cattaneo

(10) Patent No.: US 10,407,350 B2
(45) Date of Patent: Sep. 10, 2019

(54) REFRACTORY COMPOSITE MATERIAL, METHOD FOR THE PREPARATION AND USE THEREOF, MANUFACTURED ITEMS AND METHOD FOR THE PREPARATION OF SAID MANUFACTURED ITEMS

(71) Applicant: BIGARAN S.R.L., Alessandria (IT)

(72) Inventor: Gian Luigi Cattaneo, Crema (IT)

(73) Assignee: BIGARAN S.r.l., Alessandria (IT)

( * ) Notice: Subject to any disclaimer, the term of this patent is extended or adjusted under 35 U.S.C. 154(b) by 0 days.

(21) Appl. No.: 15/741,512

(22) PCT Filed: Jul. 8, 2016

(86) PCT No.: PCT/IB2016/054116
§ 371 (c)(1),
(2) Date: Jan. 3, 2018

(87) PCT Pub. No.: WO2017/009760
PCT Pub. Date: Jan. 19, 2017

(65) Prior Publication Data
US 2018/0312443 A1    Nov. 1, 2018

(30) Foreign Application Priority Data
Jul. 10, 2015 (IT) .............................. UB2015A2050

(51) Int. Cl.
| | | |
|---|---|---|
| *C04B 35/10* | (2006.01) |
| *C04B 35/14* | (2006.01) |
| *C04B 35/82* | (2006.01) |
| *C04B 35/622* | (2006.01) |
| *C04B 35/101* | (2006.01) |
| *C04B 35/624* | (2006.01) |
| *C04B 35/626* | (2006.01) |
| *C04B 35/632* | (2006.01) |
| *C04B 35/634* | (2006.01) |
| *C04B 35/638* | (2006.01) |
| *C04B 35/64* | (2006.01) |
| *C04B 35/66* | (2006.01) |
| *C04B 35/63* | (2006.01) |
| *C04B 35/657* | (2006.01) |
| *H01B 3/08* | (2006.01) |
| *H01B 3/12* | (2006.01) |
| *H01B 17/42* | (2006.01) |
| *H01B 19/00* | (2006.01) |
| *H01H 33/08* | (2006.01) |

(52) U.S. Cl.
CPC .......... *C04B 35/82* (2013.01); *C04B 35/1015* (2013.01); *C04B 35/622* (2013.01); *C04B 35/624* (2013.01); *C04B 35/62222* (2013.01); *C04B 35/62625* (2013.01); *C04B 35/62655* (2013.01); *C04B 35/62665* (2013.01); *C04B 35/62685* (2013.01); *C04B 35/632* (2013.01); *C04B 35/6303* (2013.01); *C04B 35/634* (2013.01); *C04B 35/638* (2013.01); *C04B 35/63488* (2013.01); *C04B 35/64* (2013.01); *C04B 35/657* (2013.01); *C04B 35/66* (2013.01); *H01B 3/08* (2013.01); *H01B 3/12* (2013.01); *H01B 17/42* (2013.01); *H01B 19/00* (2013.01); *C04B 2235/3201* (2013.01); *C04B 2235/3208* (2013.01); *C04B 2235/3217* (2013.01); *C04B 2235/3222* (2013.01); *C04B 2235/3418* (2013.01); *C04B 2235/3463* (2013.01); *C04B 2235/526* (2013.01); *C04B 2235/5232* (2013.01); *C04B 2235/5236* (2013.01); *C04B 2235/5436* (2013.01); *C04B 2235/602* (2013.01); *C04B 2235/606* (2013.01); *C04B 2235/6027* (2013.01); *C04B 2235/656* (2013.01); *C04B 2235/6562* (2013.01); *C04B 2235/77* (2013.01); *C04B 2235/786* (2013.01); *C04B 2235/80* (2013.01); *C04B 2235/95* (2013.01); *C04B 2235/96* (2013.01); *C04B 2235/9607* (2013.01); *H01H 33/08* (2013.01)

(58) Field of Classification Search
CPC ....... C04B 35/101; C04B 35/18; C04B 35/19; C04B 35/44
See application file for complete search history.

(56) References Cited

U.S. PATENT DOCUMENTS 6,077,801 A * 6/2000 Zanoli ..................... C03B 5/43
501/127
2002/0103070 A1   8/2002 Toshihiro

FOREIGN PATENT DOCUMENTS

| GB | 1244895 A | 9/1971 |
| JP | 2006008427 A | 1/2006 |
| WO | 2013108233 A2 | 7/2013 |

OTHER PUBLICATIONS

Database WPI, Week 200609, Thompson Scientific, London, GB; AN 2006-082974, XP002751572 & JP 2006 008427, Jan. 12, 2016.
Anonymous, "Data Sheet: Diaoyudaoite—NaAl11017", Mineral Data Publishing, Oct. 26, 2015, retrieved from the Internet: URL: http://rruff.info/doclib/hom/diaoyudaoite.pdf, retrieved on Sep. 23, 2016.
International Search Report in PCT/IB2016/054116 dated Oct. 10, 2016.
Written Opinion in PCT/IB2016/054116 dated Oct. 10, 2016.

* cited by examiner

*Primary Examiner* — Karl E Group
(74) *Attorney, Agent, or Firm* — Manelli Selter PLLC; Edward Stemberger

(57) ABSTRACT

Refractory composite material based on $Al_2O_3$ in the form of corundum, $SiO_2$ in the form of quartz and sodium aluminate having the formula $NaAl_{11}O_{17}$ or $Na_2O$—$11Al_2O_3$, method for preparing the same, use thereof for preparing manufactured items, as well as manufactured items made thereby and use thereof.

15 Claims, 2 Drawing Sheets

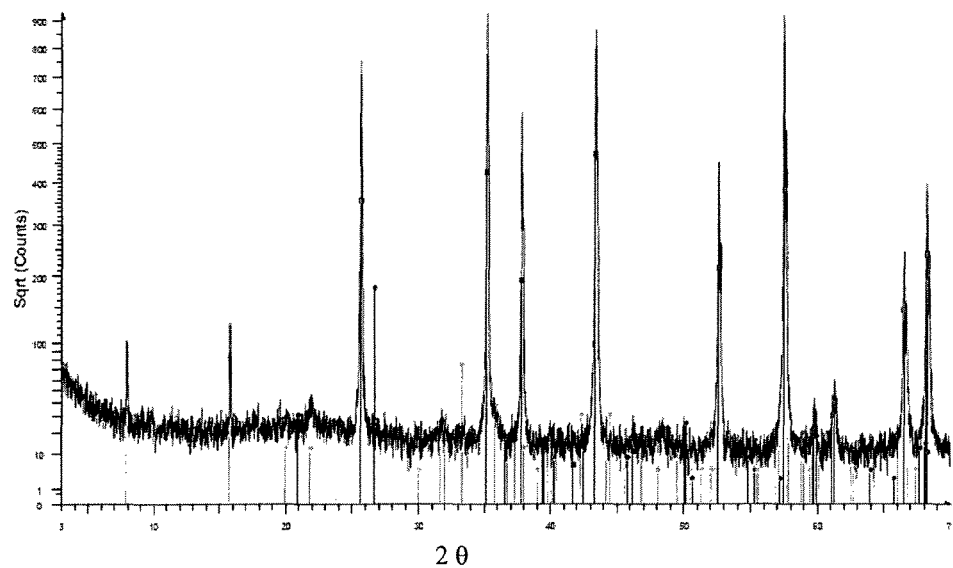
Figure 1: diffractogram of the refractory composite material which is the object of the present invention

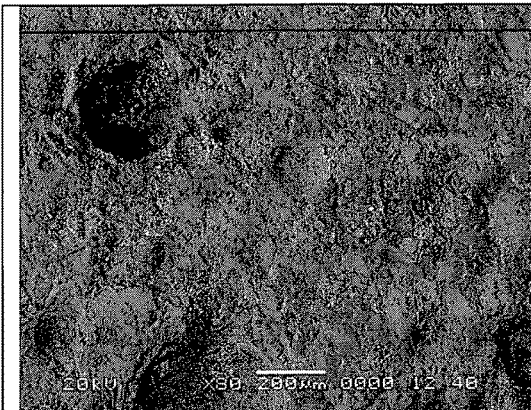

Figure 2 SEM image with 80x magnification of the cross section of the sample of refractory composite material under examination: macroporosity.

Figure 3 I SEM image with 100x magnification of the cross section of the sample of refractory composite material under examination: macroporosity.

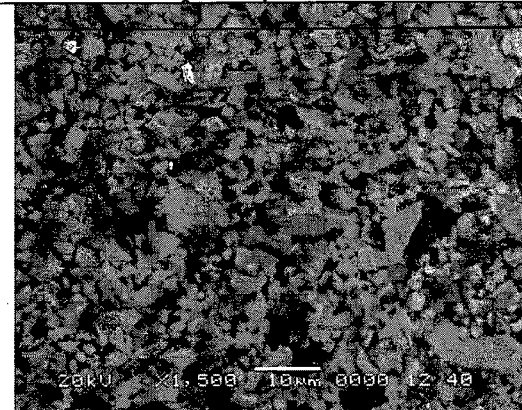

Figure 4 SEM image with 1500x magnification of the cross section of the sample of refractory composite material under examination: macroporosity: crystalline grains.

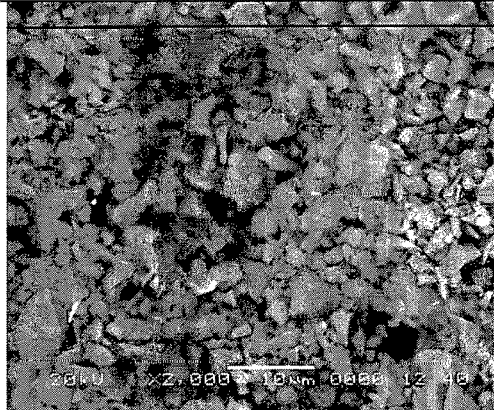

Figure 5 SEM image with 2000x magnification of the cross section of the sample of refractory composite material under examination: macroporosity: crystalline grains.

REFRACTORY COMPOSITE MATERIAL, METHOD FOR THE PREPARATION AND USE THEREOF, MANUFACTURED ITEMS AND METHOD FOR THE PREPARATION OF SAID MANUFACTURED ITEMS

TECHNICAL FIELD OF THE INVENTION

The present invention relates to a refractory composite material with a highly aluminous matrix having high thermal resistance and refractoriness, suitable to resist the thermal shocks which are specific of both steel working and electric applications, such as arc-chutes in extreme electric operation conditions (high/very high powers), at the same time being an excellent alternative to both ceramic materials and cement-based composites. The refractory composite material which is the object of the present invention has simultaneously the following properties of:
excellent mechanical resistance (comparable to ceramic materials), high refractoriness, excellent resistance to thermal shocks, exceptional resistance to electric arc as well as such a machinability as to allow finished or semifinished products to be implemented through forming processes based on the use of silicone moulds.

STATE OF THE ART

Over the years materials have been developed, consisting of both reinforced cement-based composite materials and ceramic materials in order to implement finished manufactured items having complex shapes and morphologies, to be used in both the steel working and the electric industrial fields. Said materials must have at the same time improved properties of mechanical resistance, high refractoriness, excellent machinability and forming, excellent resistance to thermal shocks and exceptional efficiency in resisting arc in the presence of high and very high voltages.

The reinforced cement-based composite materials have shown strong limits in the event of electric applications such as arc-chutes in extreme electric operation conditions (high/very high powers): the manufactured items implemented with said materials collapse, whereas ceramic materials do not ensure those properties of machinability and forming which allow them to be used for implementing finished manufactured items with a very high quality standard of dimensional reproducibility, in compliance with tolerances, and accuracy of surfaces.

Accordingly, there existed a strong need to develop new composite materials which were able to overcome simultaneously all the specific limits of the above-mentioned materials, as a valid alternative to both reinforced cement-based composites, characterised by limits of applicability in the electric industrial fields in certain conditions of use at high and very high voltages, and ceramic materials, having a very complex and hardly cost-effective production cycle and also being particularly unsuitable to produce manufactured items with a particularly complex shape and morphology.

SUMMARY OF THE INVENTION

Continuing research in the present technical field, the applicant has surprisingly and unexpectedly implemented a new refractory composite material based on corundum, quartz and sodium and aluminium oxide, such as for example $NaAl_{11}O_{17}$, that is sodium aluminate having the formula $NaAl_{11}O_{17}$ or $Na_2O.11Al_2O_3$, particularly sodium aluminate $Na_2O\ 11Al_2O\beta$ or Diaoyudaoite, as well as a refractory body or manufactured item or a body or manufactured item made of thermal or electric insulator based on said refractory composite material.

A further object of the present invention is a process for preparing the refractory composite material based on corundum, quartz and sodium and aluminium oxide, such as for example $NaAl_{11}O_{17}$, that is sodium aluminate having the formula $NaAl_{11}O_{17}$ or $Na_2O.11Al_2O_3$, particularly sodium aluminate $Na_2O\ 11Al_2O_3\beta$ or Diaoyudaoite, as well as a process for preparing a refractory body or manufactured item or a body or manufactured item made of thermal or electric insulator based on said refractory composite material.

A further object of the present invention is the refractory composite material which is obtained/obtainable through the process which is the object of the present invention.

The refractory composite material resulting from the present invention therefore comprises corundum, quartz and sodium and aluminium oxide such as for example $NaAl_{11}O_{17}$, that is sodium aluminate having the formula $NaAl_{11}O_{17}$ or $Na_2O.11Al_2O_3$, particularly sodium aluminate $Na_2O\ 11Al_2O_3\beta$ or Diaoyudaoite.

A further object of the present invention is the slurry to obtain the refractory composite material based on corundum, quartz and sodium and aluminium oxide, such as for example $NaAl_{11}O_{17}$, that is sodium aluminate having the formula $NaAl_{11}O_{17}$ or $Na_2O.11Al_2O_3$, particularly sodium aluminate $Na_2O\ 11Al_2O_3\beta$ or Diaoyudaoite, the slurry comprising:
water
melted alumina and/or tabular alumina,
reactive alumina,
microsilica (MS) and/or colloidal silica,
flux oxides,
inorganic dispersant additive based on $SiO_2$ and $Al_2O_3$,
inorganic accelerating additive based on $SiO_2$ and $Al_2O_3$,
inorganic toughening additive based on $SiO_2$ and $Al_2O_3$,
organic dispersant additive comprising polymer material based on polyethylene glycol,
organic de-airing additive comprising alkoxylated fatty alcohols and polysiloxanes on inorganic medium,
optionally comprising glass fibres based on silica and zircon.

A further object of the present invention is the use of the refractory composite material according to the present invention, such as: plates for arc-chutes, particularly arc-chutes for high-voltage contactors, insulating plates resisting to high temperatures and high voltages, finned insulators, resistor supports, as well as coatings for high-temperature furnaces and heat-exchanger pipes of the bodies or manufactured items made of electric/thermal refractory or insulating material as described above; further objects of the present invention and also objects of the present invention are plates for arc-chutes, particularly arc-chutes for high-voltage contactors, insulating plates resisting to high temperatures and high voltages, finned insulators, resistor supports, as well as coatings for high-temperature furnaces and heat-exchanger pipes of the bodies or manufactured items made of electric/thermal refractory or insulating material as described above, all comprising the refractory composite material based on $Al_2O_3$ in the form of corundum, $SiO_2$ in the form of quartz and sodium and aluminium oxide, such as for example $NaAl_{11}O_{17}$, that is sodium aluminate having the formula $NaAl_{11}O_{17}$ or $Na_2O.11Al_2O_3$, particularly sodium aluminate $Na_2O\ 11Al_2O_3\beta$ or Diaoyudaoite, according to the present invention.

BRIEF DESCRIPTION OF THE FIGURES

FIG. 1. It shows the diffractogram of the refractory composite material which is the object of the present invention, comparing the graph of the obtained diffractogram, hence the relevant most significant peaks, to which the signals corresponding to the standard values of the angle 2θ of the three main identified crystallographic phases are overlapped: the diffractogram peaks corresponding to the standards of $Al_2O_3$ in the form of corundum (vertical strokes marked by the square symbol), the diffractogram peaks corresponding to the standards of $SiO_2$ in the form of quartz (vertical strokes marked by the diamond-shaped symbol), the diffractogram peaks corresponding to the standards of the mixed sodium and aluminium oxide (vertical strokes marked by the round symbol).

FIG. 2. It shows the SEM image with 80× magnification of the cross section of the sample of refractory composite material under examination: macroporosity is highlighted.

FIG. 3. It shows the SEM image with 100× magnification of the cross section of the sample of refractory composite material under examination: macroporosity is highlighted.

FIG. 4. It shows the SEM image with 1500× magnification of the cross section of the sample of refractory composite material under examination: crystalline grains are highlighted.

FIG. 5. It shows the SEM image with 2000× magnification of the cross section of the sample of refractory composite material under examination: crystalline grains are highlighted.

DETAILED DESCRIPTION OF THE INVENTION

An object of the present invention is accordingly a refractory composite material based on $Al_2O_3$ in the form of corundum, $SiO_2$ in the form of quartz and sodium and aluminium oxide, such as for example $NaAl_{11}O_{17}$, diaoyaudaoite syn beta $NaAl_{11}O_{17}$ ½ $(Na_2O.11Al_2O_3)$, having a hexagonal structure with: 5.59300—b: 5.59300—c: 22.61000—α: 90.000—β: 90,000—γ: 120.000.

The refractory composite material which is the object of the present invention was submitted to qualitative and quantitative SEM/EDS analysis and diffractometric analysis in order to identify its chemical and morphological composition by identifying the prevailing chemical components and the main crystalline phases characterising it.

As to the diffractometric analysis, the refractory composite material which is the object of the present invention was analysed under the following conditions:
Instrumental Conditions:

| Siemens | Theta/2Theta, | Generator: Anode Cu |
|---|---|---|
| D5000 | KV 40, mA 40 | λ = 1.54056 |

Instrument: S006
Experimental Conditions:

| Range | Step size | Step time |
|---|---|---|
| 5-70° 2θ | 0.02° | 2 sec |

Crystalline Phases Identified by the Diffractogram:

| Crystalline phases | Chemical formula |
|---|---|
| Alumina | $Al_2O_3$ |
| Quartz | $SiO_2$ |
| Sodium and aluminium oxide | $NaAl_{11}O_{17}$ |

In particular, the refractory composite material which is the object of the present invention comprises, as the main crystalline forms, $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, whose crystalline phases are identified in the diffractogram shown in FIG. 1, wherein comparing the graph of the obtained diffractogram, hence the relevant most significant peaks, to which the signals corresponding to the standard values of the angle 2θ of the three main identified crystallographic phases are overlapped: the diffractogram peaks corresponding to the standards of $Al_2O_3$ in the form of corundum (vertical strokes marked by the square symbol), the diffractogram peaks corresponding to the standards of $SiO_2$ in the form of quartz (vertical strokes marked by the diamond-shaped symbol), the diffractogram peaks corresponding to the standards of the mixed sodium and aluminium oxide (vertical strokes marked by the round symbol).

The following three main crystalline phases are identified by said diffractogram:
   $Al_2O_3$ in the form of corundum: $Al_2O_3$, to which the crystallographic cell having a hexagonal structure with: 4.75800—b: 4.75800—c: 12.99100—α: 90.000—β: 90,000—γ: 120,000, primitive, is ascribable;
   $SiO_2$ in the form of quartz: $SiO_2$, to which the crystallographic cell having a hexagonal structure with: 4.91334—b: 4.91334—c: 5.40524—α: 90.000—β: 90,000—γ: 120,000, primitive, is ascribable;
   and sodium and aluminium oxide, such as for example $NaAl_{11}O_{17}$ to which the crystallographic cell diaoyaudaoite beta $NaAl_{11}O_{17}$ ½ $(Na_2O.11Al_2O_3)$, having a hexagonal structure with: 5.59300—b: 5.59300—c: 22.61000—α: 90,000—β: 90,000—γ: 120,000, is ascribable.

As to the qualitative morphologic and quantitative SEM/EDS analysis, the refractory composite material which is the object of the present invention was analysed under the following conditions:
Instrumental Conditions:
SEM microscope model JEOL JSM-5910LV
Accomplished Measurements:
SEM images with different magnifications of the cross section of the composite material which is the object of the present invention, shown in FIGS. 2, 3, 4 and 5; EDS analysis on the milled sample.

From the morphological standpoint, the samples of the refractory composite material according to the present invention show several macroscopic closed porosities ranging between 100 µm and 550 µm. Aside from said macroporosities, the material has a well dense and even look.

The size of the crystalline grains ranges between 2 µm and 5 µm.

The refractory composite material which is the object of the present invention has a particle size distribution preferably not exceeding 5 micrometers, more preferably ranging between 2 and 5 micrometers.

The refractory composite material which is the object of the present invention was milled and the powder was homogenised in an alumina mortar; the powder was then pressed so as to accomplish the microanalytical chemical analysis thereon. The EDS analysis was then accomplished by collecting five EDS spectra, with the results shown in the following tables.

The analysis does not allow elements with a lower weight than nitrogen to be quantified; oxygen is instead stoichiometrically recalculated on the other identified elements, hence expressing them in the form of oxides.

TABLE 1

Normalised results of the five EDS spectra accomplished on the milled sample under examination.

| Oxide | Spectrum 1 | Spectrum 2 | Spectrum 3 | Spectrum 4 | Spectrum 5 |
|---|---|---|---|---|---|
| $Na_2O$ | 1.34 | 1.40 | 1.28 | 1.30 | 1.16 |
| $Al_2O_3$ | 82.11 | 80.14 | 81.52 | 81.52 | 82.62 |
| $SiO_2$ | 16.22 | 18.10 | 16.78 | 16.60 | 15.77 |
| $K_2O$ | 0.08 | 0.04 | 0.06 | 0.14 | 0.11 |
| CaO | 0.25 | 0.32 | 0.36 | 0.44 | 0.34 |

TABLE 2

Average values and standard deviation values of the EDS analysis on the milled sample under examination.

| Oxide | Average % wt | St. Dev. |
|---|---|---|
| $Na_2O$ | 1.30 | 0.09 |
| $Al_2O_3$ | 81.58 | 0.93 |
| $SiO_2$ | 16.69 | 0.87 |
| $K_2O$ | 0.09 | 0.04 |
| CaO | 0.34 | 0.07 |

The quantitative diffractometric analysis allowed the crystallographic composition to be identified as % by weight of the individual identified crystalline phases and of the amorphous silica phase, as shown in the following table 3:

| Crystalline phases | % wt |
|---|---|
| Sodium aluminate $Na_2O$ $11Al_2O_3\beta$ or Diaoyudaoite | 20-24 |
| $Al_2O_3$ $\alpha$ | 58-64 |
| $SiO_2$ Quartz | 10-14 |
| Amorphous glass phase | 4-6 |

The quantitative diffractographic analysis also shows that the weight ratio between $\alpha$ and $\beta$ $Al_2O_3$ ranges from 74-76% of $\alpha$ $Al_2O_3$ and 24-26% of $\beta$ $Al_2O_3$.

In particular, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3$ or Diaoyudaoite, according to the present invention, comprises: Al, Si, Na and oxygen, which in the form of $Al_2O_3$, $SiO_2$, $Na_2O$ oxides are present in such amounts that: the overall amount of $Al_2O_3$ is no less than 75 wt %, preferably no less than 80 wt %, the overall amount of $SiO_2$ in the form of quartz is no less than 10 wt %, preferably no less than 12 wt %, the overall amount of $Na_2O$ is no less than 0.5 wt %, preferably no less than 1 wt %, said percentages being calculated on 100 parts by weight of the combination of said oxides.

More particularly, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, according to the present invention, comprises: Al, Si, Na, K, Ca and oxygen, which in the form of $Al_2O_3$, $SiO_2$, $Na_2O$, $K_2O$ and CaO oxides are present in such amounts that: the overall amount of $Al_2O_3$ is no less than 80 wt %, the overall amount of $SiO_2$ in the form of quartz is no less than 12 wt %, the overall amount of $Na_2O$ is no less than 1 wt %, the overall amount of $K_2O$ is no less than 0.3 wt % and the overall amount of CaO is no less than 0.05 wt %, said percentages being calculated on 100 parts by weight of the combination of said oxides.

Even more particularly, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, according to the present invention, comprises: Al, Si, Na, K, Ca and oxygen, which in the form of $Al_2O_3$, $SiO_2$, $Na_2O$, $K_2O$ and CaO oxides are present in such amounts that: the overall amount of $Al_2O_3$ ranges between 85 and 86 wt %, the overall amount of $SiO_2$ in the form of quartz ranges between 12 and 13 wt %, the overall amount of $Na_2O$—$K_2O$—CaO ranges between 2 and 2.5 wt %, said percentages being calculated on 100 parts by weight of the combination of said oxides.

The peculiarity of the refractory composite material which is the object of the present invention is that the overall amount of $SiO_2$ in the form of quartz, as defined above, is no less than 10 wt % relative to the combination of said overall amount of $SiO_2$ in the form of quartz with the overall amounts of $Al_2O_3$ and $Na_2O$, the combination of said oxides present in the refractory composite material which is the object of the present invention being 100 parts by weight. The same applies to the refractory composite material according to the present invention also comprising K and Ca in the form of oxides, so that the overall amount of $SiO_2$ in the form of quartz, as defined above, is expressed as % by weight relative to the combination of said overall amount of $SiO_2$ in the form of quartz with the overall amounts of $Al_2O_3$, $Na_2O$, $K_2O$ and CaO, the combination of said oxides present in the refractory composite material which is the object of the present invention being 100 parts by weight.

The refractory composite material which is the object of the present invention has also been characterised from the chemical-physical standpoint in that measures have performed thereon to characterise the relevant properties of actual and theoretical density, open porosity and absorbed water, as well as to characterise the relevant properties of thermal conductivity and specific heat.

Characterisation of the Properties of Actual and Theoretical Density, Open Porosity and Absorbed Water of Samples of the Refractory Composite Material which is the Object of the Present Invention.

Used Instrument:

Microanalytical balance SARTORIUS CP124S precision 0.0001 g

Analysis Method:

Standard UNI 60672: determination of actual and theoretical density, open porosity and absorbed water of the samples of the refractory composite material which is the object of the present invention.

Procedure:

The samples were dried in an oven at 120° C. for 2 hours and their dry weight ($m_s$) was determined; the samples were immersed in distilled water and heated to boiling temperature for 1 hour. The samples were then cooled in distilled water. The immersed weight ($m_w$) and the wet weight ($m_h$) were determined. The theoretical and actual density, the open porosity and the absorbed water were calculated with the following formulas:

$$\text{Density} = \frac{m_s}{(m_h - m_w)}$$

$$\text{Porosity \%} = \frac{(m_h - m_s)}{(m_h - m_w)} * 100$$

$$\text{Absorbed water \%} = \frac{(m_h - m_s)}{m_s} * 100$$

$$\text{Theoretical density} = \frac{\text{Density}}{(100 - \text{Porosity})} * 100$$

| Specimens of the refractory composite material | Density [g/cm³] | Porosity [%] | Absorbed water [%] | Theoretical density [g/cm³] |
|---|---|---|---|---|
| 1 | 2.90 | 14.04 | 4.84 | 3.38 |
| 2 | 2.98 | 12.74 | 4.27 | 3.42 |
| 3 | 2.99 | 13.05 | 4.37 | 3.43 |
| Average | 2.96 | 13.28 | 4.49 | 3.41 |
| Deviation | 0.05 | 0.68 | 0.30 | 0.03 |

The refractory composite material which is the object of the present invention has a density ranging between 2.90 and 2.99 g/cm³ with an average value of 2.93 g/cm³, a porosity ranging between 12.74 and 14.04% by volume with an average value of 13.28%, a theoretical density ranging between 3.38 and 3.43 g/cm³ with an average value of 3.41 g/cm³, measured according to standard UNI 60672: determining actual and theoretical density, open porosity and absorbed water.

Characterisation of the Properties of Thermal Conductivity and Specific Heat of Samples of the Refractory Composite Material which is the Object of the Present Invention

| Physical features of the sample of refractory composite material according to the present invention: | | |
|---|---|---|
| Cylinder diameter: | 12.43 | mm |
| Cylinder thickness: | 4.03 | mm |
| Density: | 2.833 | g/cc |
| Measurement method: | | |
| Instrument: | LFA 457 Microflash - Netzsch | |
| Method: | implementation of methods ASTM E-1461 and DIN EN 821 | |
| Instrumental conditions: | | |
| Coating: | Graphite | |
| Laser voltage: | 1538 Volts | |
| Optical filter: | 100 % | |
| Amplifier gain: | 50 | |
| No. of shots: | 5 | |
| Furnace atmosphere: | N2 | |
| Method of transient fitting: | Cowan + pulse correction | |

| Temp. [° C.] | Specific heat [J/(g · ° K)] | | Thermal diffusivity [mm²/s] | | Thermal conductivity [W/(m · ° K)] | |
|---|---|---|---|---|---|---|
| | Avg | STD | Avg | STD | Avg | STD |
| 25 | 1.33 | 0.20 | 2.17 | 0.03 | 8.16 | 0.12 |
| 800 | 1.26 | 0.07 | 0.74 | 0.03 | 2.61 | 0.11 |

Avg: average value
STD: standard deviation

The refractory composite material which is the object of the present invention has an average specific heat of 1.33 J/(g·° K) and an average thermal conductivity of 8.16 W/(m·° K), measured at 25° C., and an average specific heat of 1.26 J/(g·° K) and an average thermal conductivity of 2.61 W/(m·° K), measured at 800° C. according to the methods ASTM E-1461 and DIN EN 821. Optionally, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O\ 11Al_2O_3\beta$ or Diaoyudaoite, according to the present invention, can also comprise glass fibres based on silica and zircon which, when present, preferably have an average length ranging between 4-8 mm, more preferably between 5-7 mm, even more preferably 6 mm.

When present, the glass fibres based on silica and zircon according to the present invention are fibres having a density ranging between 2.5 and 2.7 g/cm³, and even more particularly the glass fibres based on silica and zircon are present in an amount by weight ranging between 0.1 and 0.15 g per cm³, more preferably between 0.11 and 0.12 g per cm³ of the refractory composite material according to the present invention, more particularly the glass fibres based on silica and zircon are present in a number ranging between 800 and 1200 per cm³, more preferably between 900 and 1100 per cm³ of the refractory composite material according to the present invention.

Glass fibres based on silica and zircon are to be understood as glass fibres which are well known in the art, consisting of glass fibres made alkali resisting by the presence of Zr in the form of zirconia or zirconium dioxide, in general consisting of glass fibres comprising a % of zirconia ranging between 10-25%, preferably 12-20%, even more preferably 13-15% by weight of the glass fibres.

In said glass fibres the component silica $SiO_2$ is prevailing, since it may range between 55% and 75%, between 60% and 70% by weight of the fibres, and a minimum part of flux components, such as mainly calcium and sodium oxides, are present therein in a maximum amount of 20% by weight of the fibres.

Expressing said percentages as ratios between $SiO_2$ and zircon, namely zirconium silicate $Zr(SiO_4)$, said percentages can be expressed as: $ZrSiO_4$ 14-36% and $SiO_2$ 66-44%, $ZrSiO_4$ 17-29% and $SiO_2$ 63-51%, $ZrSiO_4$ 18-22% and $SiO_2$ 62-58%, in all cases the remaining % comprising flux components.

In a particularly preferred form of embodiment of the refractory composite material based on $Al_2O_3$ in the form of corundum, $SiO_2$ in the form of quartz and sodium and aluminium oxide, such as for example NaAl$_{11}$O$_{17}$, namely sodium aluminate having the formula NaAl$_{11}$O$_{17}$ or Na$_2$O.11Al$_2$O$_3$, particularly sodium aluminate Na$_2$O 11Al$_2$O$_3$β or Diaoyudaoite, said refractory composite material is obtained through a process comprising the following steps:

a) Step of mixing in water, under continuous stirring, in the presence of an organic dispersant additive comprising polymer material based on previously dissolved polyethylene glycol: microsilica (MS) and/or colloidal silica, with flux oxides along with: an inorganic dispersant additive, an inorganic accelerating additive and an inorganic toughening additive, all based on SiO$_2$ and Al$_2$O$_3$, as well as an organic de-airing additive comprising alkoxylated fatty alcohols and polysiloxanes on inorganic medium, followed by the addition, always under stirring in water, of reactive alumina and melted alumina and/or tabular alumina, to form a slurry;

b) Step of casting the slurry obtained in step a) in vibrating moulds or receptacles;

c) Step of "Gel-bonding" after casting in the moulds the slurry obtained in step a), followed by stripping and cross-linking through following treatments of: drying at ambient temperature 20-24° C. for 8 hours; following heat treatment with average gradient of 50±3° C. for densification and the formation of stable bonds at 700-800° C. in a moderately oxidizing environment.

A further object of the present invention is the process for preparing the refractory composite material based on Al$_2$O$_3$ in the form of corundum, SiO$_2$ in the form of quartz and sodium and aluminium oxide, such as for example NaAl$_{11}$O$_{17}$, namely sodium aluminate having the formula NaAl$_{11}$O$_{17}$ or Na$_2$O.11Al$_2$O$_3$, particularly sodium aluminate Na$_2$O 11Al$_2$O$_3$β or Diaoyudaoite, which is the object of the present invention, said process comprising the steps a), b) and c) as described above.

In a preferred form of embodiment of the refractory composite material based on Al$_2$O$_3$ in the form of corundum, SiO$_2$ in the form of quartz and sodium and aluminium oxide, such as for example NaAl$_{11}$O$_{17}$, namely sodium aluminate having the formula NaAl$_{11}$O$_{17}$ or Na$_2$O 11Al$_2$O$_3$, particularly sodium aluminate Na$_2$O 11Al$_2$O$_3$ or Diaoyudaoite, which is the object of the present invention, as well as the relevant process of preparation as described above, in step a) of mixing in water:

the melted alumina and/or the tabular alumina is present in a percentage ranging between 60 and 72 wt %, more preferably between 65 and 68 wt %, the reactive alumina is present in a percentage ranging between 10 and 20 wt %, more preferably between 13 and 17 wt %, the microsilica (MS) and/or the colloidal silica is present in a percentage ranging between 6 and 10 wt %, more preferably between 7 and 9 wt %, the flux oxides are present in a percentage ranging between 2 and 4 wt %, more preferably between 2.5 and 3.5 wt %, the inorganic dispersant additive based on SiO$_2$ and Al$_2$O$_3$ is present in a percentage ranging between 1 and 1.5 wt %, more preferably between 0.6 and 0.8 wt %, the inorganic accelerating additive based on SiO$_2$ and Al$_2$O$_3$ is present in a percentage ranging between 0.6 and 1.2 wt %, more preferably between 0.6 and 0.8 wt %, the inorganic toughening or mechanic reinforcement additive based on SiO$_2$ and Al$_2$O$_3$ is present in a percentage ranging between 2 and 4 wt %, more preferably between 2.5 and 3.5 wt %, the organic dispersant additive comprising polymer material based on polyethylene glycol is present in a percentage ranging between 0.07 and 0.1 wt %, more preferably between 0.06 and 0.08 wt %, the organic de-airing additive comprising alkoxylated fatty alcohols and polysiloxanes on inorganic medium is present in a percentage ranging between 0.02 and 0.1 wt %, more preferably between 0.03 and 0.06 wt % the remaining part being water, said percentages being calculated on 100 parts by weight of the resulting slurry.

Melted alumina according to the present invention is to be understood as melted alumina selected from pure alumina with a pureness degree of no less than 99.7% and a particle size distribution of no more than 0.5 mm, preferably with a particle size distribution of 50-120μ (micrometers), or pure alumina with a pureness degree of no less than 99.5% and a particle size distribution ranging between 10μ and 60μ (micrometers), or mixtures thereof.

Tabular alumina according to the present invention is to be understood as tabular alumina selected from pure alumina with a pureness degree of no less than 99.5% and a particle size distribution of no more than 0.5 mm, preferably with a particle size distribution of no more than 0.3 mm, or mixtures thereof.

Reactive alumina according to the present invention is to be understood as reactive alumina with a pureness degree of 99.9%, with unimodal and bimodal particle size distribution curves, having the size of elementary crystals ½μ (micrometer).

The use of these aluminas, mainly of the reactive aluminas, is aimed at improving the rheological features of the slurry and provides the manufactured item with a high structural evenness.

Micosilica (MS) according to the present invention is to be understood as a material based on silica with a pureness degree of more than 98% in SiO$_2$, with particle size ranging from 0.01 to 1μ (or micrometers), hence submicronic (nanometric). The particles are spheroidal and provide good flowability to the slurry. In gel-bonding systems, microsilica cross-links, contributing to provide toughness to the manufactured item upon stripping.

Microsilica e very reactive during sintering, improving the "quality" of the "ceramic" bond at reduced temperatures.

Microsilica is a material which is easily retrieved on the market.

Colloidal silica according to the present invention is to be understood as colloidal silica comprising an aqueous dispersion, from 40 to 50% by weight of water, of "silica nuclei or sols", silicon spheroidal amorphous particles, having a nanometric size, cross-linking in the gel-bonding systems, similarly to microsilica.

Inorganic dispersant additive based on SiO$_2$ and Al$_2$O$_3$ according to the present invention is to be understood as a material comprising 60/70% by weight of SiO$_2$ and 20/30% by weight of Al$_2$O$_3$, in the form of powder, suitable to be used in systems based on microsilica or colloidal silica. This is a material which can be easily retrieved on the market. Said additive reduces the percentage of water in the slurry and improves the rheological properties of the system, providing more flowability to the slurry in the moulds.

Inorganic accelerating additive based on SiO$_2$ and Al$_2$O$_3$ according to the present invention is to be understood as a material comprising 70/80% by weight of SiO$_2$ and 10/20% by weight of Al$_2$O$_3$, in the form of powder, suitable to be used in systems based on microsilica or colloidal silica. This is a material which can be easily found on the market.

It controls the SET-TIME of the slurry, reduces the time of processing of the slurry and stripping of the manufactured item, increases the resistance of the "green", that is the manufactured item being formed before sintering thereof, improves the refractory properties of the resulting composite material.

Inorganic toughening additive based on $SiO_2$ and $Al_2O_3$ according to the present invention is to be understood as a material comprising 55/70% by weight of $SiO_2$ and 25/40% by weight of $Al_2O_3$, in the form of powder, suitable to be used in systems based on microsilica or colloidal silica. It is a material which can be easily retrieved on the market. It improves the toughness of the "green" manufactured item, improves the rheological properties of the slurry, controls the time of processing of the slurry and the time of stripping of the manufactured item.

Flux oxides according to the present invention are to be understood as one or more oxides selected from: $Na_2O$, $K_2O$, $CaO$, $MgO$, $Al_2O_3$, $B_2O_3$, $SiO_2$, their mixture being preferred, in the form of micronized powder. Said flux oxides are easily retrieved on the market. Said mixture of flux oxides is highly akin to microsilica, improves the formation of stable bonds in the composite at low temperatures, reduces the porosity of the end structure, significantly improves the mechanical resistance of the manufactured item.

Organic dispersant additive according to the present invention is to be understood as a material comprising polymer material based on polyethylene glycol.

This is a material which is easily retrievable on the market. This additive, suitable for gel-bonding systems of composites based on microsilica, allows the amount of water to be used in the slurry to be strongly reduced and helps improve the processing rheological conditions.

Organic de-airing additive comprising alkoxylated fatty alcohols and polysiloxanes on inorganic medium according to the present invention is to be understood as a material of antifoaming powder based on alkoxylated fatty alcohols and polysiloxanes on inorganic medium. This is a material which is easily retrievable on the market. This additive dispersed in the slurry strongly acts as antifoam, positively reducing the porosities of the refractory composite material being built.

In further, even more preferred, forms of embodiment of the refractory composite material according to the present invention, as well as the relevant process of preparation as described above, in step a) of mixing in water, the weight ratios between melted and/or tabular alumina and reactive alumina, with different degrees of pureness and particle size distribution, in the slurry preferably range between 80:20 and 85:15.

When both melted alumina and tabular alumina are present at the same time, the weight ratio between them ranges between 70:30 and 30:70, preferably amounts to 50:50, having the same particle size.

When both microsilica (MS) and colloidal silica are present at the same time, the weight ratio between them ranges between 70:30 and 30:70, although use of microsilica alone is preferred.

When present, glass fibres based on silica and zircon according to the present invention are added in the process for preparing the refractory composite material which is the object of the present invention in step a) of mixing in water, preferably in the amount of 3% by weight, more preferably in the amount of 2% by weight out of 100 parts in weight of the resulting slurry.

A further object of the present invention is the slurry to obtain the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O\ 11Al_2O_3\beta$ or Diaoyudaoite, the slurry comprising:
  water
  melted alumina and/or tabular alumina,
  reactive alumina,
  microsilica (MS) and/or colloidal silica,
  flux oxides,
  inorganic dispersant additive based on $SiO_2$ and $Al_2O_3$,
  inorganic accelerating additive based on $SiO_2$ and $Al_2O_3$,
  inorganic toughening additive based on $SiO_2$ and $Al_2O_3$,
  organic dispersant additive comprising polymer material based on polyethylene glycol,
  organic de-airing additive comprising alkoxylated fatty alcohols and polysiloxanes on inorganic medium,
  optionally comprising glass fibres based on silica and zircon.

In particular, a further object of the present invention is the slurry to obtain the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O\ 11Al_2O_3\beta$ or Diaoyudaoite, a slurry wherein:
  the melted alumina and/or the tabular alumina is present in a percentage ranging between 60 and 72 wt %, more preferably between 65 and 68 wt %,
  the reactive alumina is present in a percentage ranging between 10 and 20 wt %, more preferably between 13 and 17 wt %,
  the microsilica (MS) and/or the colloidal silica is present in a percentage ranging between 6 and 10 wt %, more preferably between 7 and 9 wt %,
  the flux oxides are present in a percentage ranging between 2 and 4 wt %, more preferably between 2.5 and 3.5 wt %,
  the inorganic dispersant additive based on $SiO_2$ and $Al_2O_3$ is present in a percentage ranging between 1 and 1.5 wt %, more preferably between 0.6 and 0.8 wt %,
  the inorganic accelerating additive based on $SiO_2$ and $Al_2O_3$ is present in a percentage ranging between 0.6 and 1.2 wt %, more preferably between 0.6 and 0.8 wt %,
  the inorganic toughening or mechanic reinforcement additive based on $SiO_2$ and $Al_2O_3$ is present in a percentage ranging between 2 and 4 wt %, more preferably between 2.5 and 3.5 wt %,
  the organic dispersant additive comprising polymer material based on polyethylene glycol is present in a percentage ranging between 0.07 and 0.1 wt %, more preferably between 0.06 and 0.08 wt %,
  the organic de-airing additive comprising alkoxylated fatty alcohols and polysiloxanes on inorganic medium is present in a percentage ranging between 0.02 and 0.1 wt %, more preferably between 0.03 and 0.06 wt %
the remaining part being water, said percentages being calculated on 100 parts by weight of the resulting slurry.

In further, even more preferred, forms of embodiment of the refractory composite material according to the present invention, as well as the relevant process of preparation as described above, in step b) of casting, the mould or receptacle is in continuous or discontinuous vibration, preferably at constant frequency, with the purpose to favour the even distribution of the components and to avoid sedimentations and agglomerations and, when present, to allow glass fibres based on silica and zircon to be distributed evenly and in an anisotropic manner, with partial alignment of the same, as well as air bubbles to be removed.

The moulds or receptacles of step b) are of metal, ceramic, wood/cellulose, plastics, in particular silicone, or combinations thereof.

In further, even more preferred, forms of embodiment of the refractory composite material according to the present invention, as well as the relevant process of preparation as described above, in step c) crosslinking is accomplished through following treatments of: drying at ambient temperature 20-24° C. for 8 hours; following heat treatment with average gradient of 5030° C. for densification and the formation of stable bonds at 700-800° C. in a moderately oxidizing environment.

The refractory composite material which is the object of the present invention combines improved properties of excellent resistance to high voltage, high resistance to thermal shocks, accompanied by good mechanical resistance, as well as the absence of shrinking during "gel-bonding" setting or hardening and high chemical inertness.

This allows moulds with high tolerance and exceptional accuracy to be used and accordingly manufactured items made of said refractory composite material to be obtained, with high quality standard of dimensional reproducibility, in compliance with tolerances, and accuracy of surfaces.

The following are accordingly further objects of the present invention:
- a manufactured item of the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, optionally strengthened with glass fibres according to the present invention, as described above,
- a process for preparing a manufactured item of refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, said process comprising the steps of:

a) Step of mixing in water, under continuous stirring, in the presence of an organic dispersant additive comprising polymer material based on previously dissolved polyethylene glycol: microsilica (MS) and/or colloidal silica, with flux oxides along with: an inorganic dispersant additive, an inorganic accelerating additive and an inorganic toughening additive, all based on $SiO_2$ and $Al_2O_3$, as well as an organic de-airing additive comprising alkoxylated fatty alcohols and polysiloxanes on inorganic medium, followed by the addition, always under stirring in water, of reactive alumina and melted alumina and/or tabular alumina, to form a slurry;

b) Step of casting the slurry obtained in step a) in vibrating moulds or receptacles;

c) Step of "Gel-bonding" after casting in the moulds the slurry obtained in step a), followed by stripping and cross-linking through following treatments of: drying at ambient temperature 20-24° C. for 8 hours; following heat treatment with average gradient of 50±+3° C. for densification and the formation of stable bonds at 700-800° C. in a moderately oxidizing environment;

a process where steps a), b) and c) have the following/same features as steps a), b) and c) of the process for preparing the refractory composite material.

In particular, in the process for preparing a manufactured item of the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, optionally strengthened with glass fibres based on silica and zircon according to the present invention, as described above, the mould is a silicone mould. When present, glass fibres based on silica and zircon according to the present invention are added in the process for preparing a manufactured item of refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, which is the object of the present invention, in step a) of mixing in water, preferably in the amount of 3% by weight, more preferably in the amount of 2% by weight out of 100 parts in weight of the resulting slurry.

- the use of a manufactured item of refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, according to the present invention, as plates for arc-chutes, particularly arc-chutes for high-voltage contactors, insulating plates resisting to high temperatures and high voltages, finned insulators, resistor supports;
- the use of a manufactured item of refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, according to the present invention, as coatings for high-temperature furnaces and heat-exchanger pipes;

The refractory composite material as well as the manufactures items made of said material feature improved properties of electric and thermal resistance and insulation and improved properties of mechanical resistance compared to prior art materials, both ceramic materials and composite materials based on cement, particularly highly aluminous cements.

Accordingly, a further object of the present invention is the use of the refractory composite material according to the present invention as refractory and/or insulating material of an electric and/or thermal type.

In particular, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, which is the object of the present invention, as well as the manufactured items made of said material feature, in the absence of glass fibres based on silica and zircon: a mechanical flexural strength (measured according to standard CEI EN 60672 METHOD A) of more than 50±3 MPa, an arc resistance (measured according to standard ASTM D495) of more than 450 seconds, a dielectric strength (measured according to standard IEC 60243) of more than 5.00 kV/mm.

The refractory composite material and the manufactured items consisting of said material, which are the object of the present invention, show blatant advantages of super-arc resistance, high resistance to thermal shocks, good mechanical resistance combined with an improved predisposition to machinability, the latter precisely on account of the structural features of the refractory composite material and as a consequence of the process for preparing the same and for preparing the manufactured items consisting of said refractory composite material. Indeed, along with the achievement of the above improved electric, thermal and mechanical properties for the material and for the manufactured items consisting thereof, a higher ease of implementation of manufactured items of said material is achieved, with a very high quality standard of dimensional reproducibility in compliance with tolerances and with an exceptional accuracy of the surface of the obtainable manufactured item; all this is due to the lack of shrinking of the refractory composite material according to the present invention during setting or hardening of the contents of the moulds or receptacles, no chemical aggression with regard to the moulds, immediate demoulding of the composite, and therefore of the manufactured item consisting thereof, after setting, the possibility to use silicone moulds.

The refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, features: high thermal resistance and refractoriness, suitable to stand the thermal shocks which are specific of both steel working and electric applications such as arc-chutes in extreme electric operation conditions (high/very high powers), at the same time being an excellent alternative to both ceramic materials and cement-based composite materials, particularly highly aluminous cements. The refractory composite material which is the object of the present invention has simultaneously the following properties of:

excellent mechanical resistance (comparable to ceramic materials), high refractoriness, excellent resistance to thermal shocks, exceptional resistance to electric arc as well as such a machinability as to allow finished or semifinished products to be implemented through forming processes based on the use of silicone moulds.

Compared with the other prior art materials such as reinforced cement-based composite materials or ceramic materials, the refractory composite material based on $Al_2O_3$ in the form of corundum, $SiO_2$ in the form of quartz and sodium and aluminium oxide, such as for example $NaAl_{11}O_{17}$, namely sodium aluminate having the formula $NaAl_{11}O_{17}$ or $Na_2O.11Al_2O_3$, particularly sodium aluminate $Na_2O$ $11Al_2O_3\beta$ or Diaoyudaoite, which is the object of the present invention, allows the following further technical advantages to be achieved:

manufactured items made of composite material are implemented in the absence of cement, in very complex shapes, wherein forming and demoulding of the manufactured item in silicone moulds is made easier. During crosslinking/polymerization of the microsilica or colloidal silica, the composite does not alter the behaviour of silicone, so that the "life time" of moulds is very high;

in order to achieve the refractory composite material and the manufactured item consisting thereof, which are both the object of the present invention, the aging and seasoning/curing time which is typical of reinforced cement-based composite materials and of the relevant manufactured items is not required.

it is possible to use the refractory composite material and the manufactured item consisting thereof, which are both the object of the present invention, in arc-chutes and in other equipment for electric use: in particular arc-chutes for high-voltage contactors, insulating plates resisting to high temperatures and high voltages, finned insulators, resistor supports, that is for uses in the presence of high/very high electric powers, wherein the use of manufactured items made of reinforced cement-based composite materials is impossible because the thermal conditions of the arc alter the hydraulic bond of the cement manufactured item, hence creating the conditions for a catastrophic destruction of the device.

the moderate heat treatment (700° C.–800° C.) according to the present invention provides the refractory composite material and the manufactured items consisting thereof, which are both the object of the present invention, with:

Strong reduction of porosity

Formation of stable covalent bonds

High mechanical resistance unlike the ceramic materials and the relevant processes for preparation, the refractory composite material which is the object of the present invention, as well as the relevant process for preparation, have a low environmental impact, because both the material and the relevant process are highly environmentally sustainable.

The following non limiting examples describe forms of embodiment of the invention.

Example of Embodiment 1

In a universal planetary mixer 109.5 g of demineralised water are poured, to which the following are added, always under stirring, in succession:

0.75 g of the organic flow agent, 45 g of flux oxides overall 165 g of microsilica, of the inorganic dispersant, of the inorganic accelerating agent and of the inorganic toughening agent, 3 g of organic de-airing agent, overall 1290 g of reactive alumina combined with melted and/or tabular alumina.

Once the mixing is accomplished, the smooth fluid composite is poured in a vibrating silicone mould.

The mould and the composite are left to rest at ambient temperature for at least 8 hours.

The demoulded manufactured item is introduced in an oven and conditioned at 800° C. with ramp rates of 50° C./hour, permanence at 800° C. for 3 hours, to which natural cooling up to ambient temperature follows.

Example 2. Experimental Tests of Mechanical Characterisation 7 specimens having the following sizes: length 120 mm, width 10 mm and thickness 10 mm were prepared according to the procedure for preparing the composite which is the object of the present invention described in example 1.

As regards mechanical flexural strength measured according to standard CEI EN 60672 METHOD A), the mechanical characterisation on the strips as described above provided an average value on the 7 specimens of more than 50±3 MPa.

Example 3. Experimental Tests of Electric Characterisation

Two samples of the composite which is the object of the present invention were prepared, according to the procedure for preparing said material, for the characterisation of each of the electric properties.

The tests of electric characterisation performed at the department of electric engineering of the University of Genoa on the plates as described above provided the following results:

Tests of Voltaic Arc Resistance

On two square plates having the following sizes: side 95 mm, thickness 3 mm, in accordance with example 1, arc resistance was measured according to the standard ASTM D495. The samples, conditioned over 24 hours in a normalised atmosphere at a temperature of 23° C.±2° C. with a relative humidity of 50%, exhibited an average time of resistance to high-voltage and low-current electric arc of more than 450 sec (after the test, the plates were still intact), considering that the arc resistance tests were performed using tungsten electrodes in compliance with the standard ASTM D495.6.1.18;

Tests of Dielectric Strength

On two samples of the refractory composite material according to the present invention, in accordance with example 1, the dielectric strength measured according to standard IEC 60243 provided average values of more than 5.00 kV/mm.

In particular, in order to perform the tests of dielectric strength, 5 measurements were made for each samples, using hemispherical brass electrodes having a radius of curvature of 5 mm and submitting the samples to an industrial-frequency sinusoidal voltage (50 Hz); the amplitude of the sinusoidal voltage rose from 0 to the breakdown voltage at a growth rate of 1 kV/s. The tests were performed at a temperature of 23° C.±2° C., immersing the sample in a silicone oil bath (Rhodorsil H604V50).

For each sample, 5 measurements of the breakdown voltage: $V_{BD}$[kV] were performed. The dielectric strength EBD is obtained considering the nominal value of the thickness of the 3-mm sample referred to as s in the following table of dielectric strength:

| Table of dielectric strength | | | |
|---|---|---|---|
| Sample | $V_{bd}$ [kV] | s [mm] | $E_{bd}$ [kV/mm] |
| 1 | 14 | 3 | 4.7 |
|   | 20 |   | 6.7 |
|   | 20 |   | 6.7 |
|   | 18 |   | 6.0 |
|   | 22 |   | 7.3 |
| 2 | 17 | 3 | 5.7 |
|   | 15 |   | 5.0 |
|   | 16 |   | 5.3 |
|   | 18 |   | 6.0 |
|   | 18 |   | 6.0 |

Sample 1: average value $V_{bd}$ [kV] = 18.8; standard deviation = 2.7 kV
Sample 2: average value $V_{bd}$ [kV] = 16.8; standard deviation = 1.2 kV

The invention claimed is:

1. Refractory composite material based on $Al_2O_3$ in the form of corundum, $SiO_2$ in the form of quartz and sodium aluminate having the formula $NaAl_{11}O_{17}$ or $Na_2O.11Al_2O_3$ comprising: Al, Si, Na and oxygen, which in the form of $Al_2O_3$, $SiO_2$ and $Na_2O$ oxides are present in such amounts that: the overall amount of $Al_2O_3$ is no less than 75 wt %, the overall amount of $SiO_2$ in the form of quartz is no less than 10 wt %, the overall amount of $Na_2O$ is no less than 0.5 wt %, said percentages being calculated on 100 parts by weight of the combination of said oxides.

2. Refractory composite material according to claim 1, comprising: Al, Si, Na, K, Ca and oxygen, which in the form of $Al_2O_3$, $SiO_2$, $Na_2O$, $K_2O$ and CaO oxides are present in such amounts that: the overall amount of $Al_2O_3$ is no less than 80 wt %, the overall amount of $SiO_2$ in the form of quartz is no less than 12 wt %, the overall amount of $Na_2O$ is no less than 1 wt %, the overall amount of $K_2O$ is no less than 0.3 wt % and the overall amount of CaO is no less than 0.05 wt %, said percentages being calculated on 100 parts by weight of the combination of said oxides.

3. Refractory composite material according to claim 1, comprising: Al, Si, Na, K, Ca and oxygen, which in the form of $Al_2O_3$, $SiO_2$, $Na_2O$, $K_2O$ and CaO oxides are present in such amounts that: the overall amount of $Al_2O_3$ ranges between 85 and 86 wt %, the overall amount of $SiO_2$ in the form of quartz ranges between 12 and 13 wt %, the overall amount of $Na_2O$—$K_2O$—CaO ranges between 2 and 2.5 wt %, said percentages being calculated on 100 parts by weight of the combination of said oxides.

4. Process for preparing a refractory composite material based on $Al_2O_3$ in the form of corundum, $SiO_2$ in the form of quartz and sodium aluminate having the formula $NaAl_{11}O_{17}$ or $Na_2O.11Al_2O_3$, according to claim 1, said process comprising the following steps:
   a) mixing in water, under continuous stirring, in the presence of an organic dispersant additive comprising polymer material based on previously dissolved polyethylene glycol: microsilica (MS) and/or colloidal silica, with flux oxides along with: an inorganic dispersant additive, an inorganic accelerating additive and an inorganic toughening additive, all based on $SiO_2$ and $Al_2O_3$, as well as an organic de-airing additive comprising alkoxylated fatty alcohols and polysiloxanes on inorganic medium, followed by the addition, always under stirring in water, of reactive alumina and melted alumina and/or tabular alumina, to form a slurry;
   b) casting the slurry obtained in step a) in vibrating moulds or receptacles;
   c) "Gel-bonding" after casting in the moulds the slurry obtained in step a), followed by stripping and cross-linking through following treatments of: drying at ambient temperature 20-24° C. for 8 hours; following heat treatment with average gradient of 50±3° C. for densification and the formation of stable bonds at 700-800° C. in a moderately oxidizing environment.

5. Process for preparing a refractory composite material according to claim 4, wherein, in step a) of mixing in water:
   the melted alumina and/or the tabular alumina is present in a percentage ranging between 60 and 72 wt %,
   the reactive alumina is present in a percentage ranging between 10 and 20 wt %,
   the microsilica (MS) and/or the colloidal silica is present in a percentage ranging between 6 and 10 wt %,
   the flux oxides are present in a percentage ranging between 2 and 4 wt %,
   the inorganic dispersant additive based on $SiO_2$ and $Al_2O_3$ is present in a percentage ranging between 1 and 1.5 wt %, the inorganic accelerating additive based on $SiO_2$ and $Al_2O_3$ is present in a percentage ranging between 0.6 and 1.2 wt %, the inorganic toughening or mechanic reinforcement additive based on $SiO_2$ and $Al_2O_3$ is present in a percentage ranging between 2 and 4 wt %, the organic dispersant additive comprising polymer material based on polyethylene glycol is present in a percentage ranging between 0.07 and 0.1 wt %, the organic de-airing additive comprising alkoxylated fatty alcohols and polysiloxanes on inorganic medium is present in a percentage ranging between 0.02 and 0.1 wt %, the remaining part being water, said percentages being calculated on 100 parts by weight of the resulting slurry.

6. Process for preparing a refractory composite material according to claim 4, wherein, in step a) of mixing in water, glass fibres based on silica and zircon are added.

7. Process for preparing a refractory composite material according to claim 6, wherein the amount of the glass fibres based on silica and zircon is 3 wt % on 100 parts by weight of the resulting slurry.

8. Manufactured item comprising the refractory composite material based on $Al_2O_3$ in the form of corundum, $SiO_2$ in the form of quartz and sodium aluminate having the formula $NaAl_{11}O_{17}$ or $Na_2O\ 11Al_2O_3$, according to claim 1.

9. Manufactured item according to claim 8 selected from the group consisting of arc-chutes for high-voltage contactors, insulating plates resisting to high temperatures and high voltages, finned insulators, resistor supports, coatings for high-temperature furnaces and heat-exchanger pipes.

10. Manufactured item according to claim 8 as an electric insulator.

11. Manufactured item according to claim 8 as a thermal insulator.

12. Refractory composite material according to claim 1, comprising: Al, Si, Na and oxygen, which in the form of $Al_2O_3$, $SiO_2$ and $Na_2O$ oxides are present in such amounts that: the overall amount of $Al_2O_3$ is no less than 80 wt %, the overall amount of $SiO_2$ in the form of quartz is no less than 12 wt %, the overall amount of $Na_2O$ is no less than 1 wt %, said percentages being calculated on 100 parts by weight of the combination of said oxides.

13. Process for preparing a refractory composite material according to claim 5, wherein, the melted alumina and/or the tabular alumina is present in a percentage ranging between 65 and 68 wt %, the reactive alumina is present in a percentage ranging between between 13 and 17 wt %, the microsilica (MS) and/or the colloidal silica is present in a percentage ranging between 7 and 9 wt %, the flux oxides are present in a percentage ranging between 2.5 and 3.5 wt %, the inorganic dispersant additive based on $SiO_2$ and $Al_2O_3$ is present in a percentage ranging between 0.6 and 0.8 wt %, the organic de-airing additive comprising alkoxylated fatty alcohols and polysiloxanes on inorganic medium is present in a percentage ranging between 0.03 and 0.06 wt %.

14. Process for preparing a refractory composite material according to claim 4, wherein the mould or receptacle in step b) is made of silicone.

15. Process for preparing a refractory composite material according to claim 6, wherein the amount of the glass fibers based on silica and zircon is 2 wt % on 100 parts by weight of the resulting slurry.

\* \* \* \* \*